(12) United States Patent  
Lin et al.

(10) Patent No.: US 9,807,299 B2  
(45) Date of Patent: Oct. 31, 2017

(54) IMAGE CAPTURE METHODS AND SYSTEMS WITH POSITIONING AND ANGLING ASSISTANCE

(75) Inventors: Jen-Chiun Lin, Taoyuan County (TW); Bing-Sheng Lin, Taoyuan County (TW); Chun-Hung Li, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 158 days.

(21) Appl. No.: 13/598,772

(22) Filed: Aug. 30, 2012

(65) Prior Publication Data

US 2014/0063320 A1 Mar. 6, 2014

(51) Int. Cl.
H04N 5/222 (2006.01)
H04N 5/232 (2006.01)
H04N 1/387 (2006.01)

(52) U.S. Cl.
CPC ....... H04N 5/23222 (2013.01); H04N 1/3871 (2013.01); H04N 5/23293 (2013.01)

(58) Field of Classification Search
CPC ... H04N 5/23293; H04N 5/262; H04N 5/2621
USPC .................. 348/333.11, 333.02, 333.03, 239
See application file for complete search history.

(56) References Cited

U.S. PATENT DOCUMENTS

| 7,187,412 B1* | 3/2007 | Silverstein | G06F 1/1626 |
| | | | 348/208.12 |
| 8,675,089 B2* | 3/2014 | Tauchi | H04N 5/23293 |
| | | | 348/222.1 |
| 2004/0100572 A1* | 5/2004 | Kim | 348/333.01 |
| 2005/0018066 A1* | 1/2005 | Hofer | H04N 5/23293 |
| | | | 348/333.02 |
| 2005/0088542 A1* | 4/2005 | Stavely et al. | 348/239 |
| 2005/0168594 A1 | 8/2005 | Larson | |
| 2006/0204110 A1* | 9/2006 | Steinberg et al. | 382/224 |
| 2007/0002157 A1* | 1/2007 | Shintani et al. | 348/333.06 |
| 2008/0117307 A1 | 5/2008 | Sato | |
| 2008/0297617 A1* | 12/2008 | Jeong | 348/222.1 |
| 2010/0118160 A1* | 5/2010 | Tsurumi | 348/231.2 |
| 2010/0225773 A1 | 9/2010 | Lee | |
| 2012/0081402 A1* | 4/2012 | Liu | 345/651 |
| 2012/0206577 A1* | 8/2012 | Guckenberger | G06T 11/00 |
| | | | 348/47 |

FOREIGN PATENT DOCUMENTS

| CN | 101316324 A | 12/2008 |
| CN | 101595728 A | 12/2009 |
| TW | I353778 B | 12/2011 |

(Continued)

*Primary Examiner* — Sinh Tran
*Assistant Examiner* — Zhenzhen Wu
(74) *Attorney, Agent, or Firm* — Birch, Stewart, Kolasch & Birch, LLP

(57) ABSTRACT

Image capture methods and systems with positioning and angling assistance are provided. A reference image having a first set of feature points is provided. A preview image is captured and analyzed using a feature detecting algorithm to obtain a second set of feature points. A variation is calculated according to the first set of the feature points corresponding to the reference image and the second set of the feature points corresponding to the preview image, and a present-marker is rendered on a display unit according to a preset position and the variation.

37 Claims, 8 Drawing Sheets

(56) References Cited

FOREIGN PATENT DOCUMENTS

| TW | I354198 B | 12/2011 |
|----|-----------|---------|
| TW | I354490 B | 12/2011 |
| TW | I355190 B | 12/2011 |

* cited by examiner

IMAGE CAPTURE METHODS AND SYSTEMS WITH POSITIONING AND ANGLING ASSISTANCE

BACKGROUND OF THE INVENTION

Field of the Invention

The disclosure relates generally to image capture methods and systems, and, more particularly to methods and systems with positioning and angling assistance.

Description of the Related Art

Recently, portable devices, such as handheld devices, have become more and more technically advanced and multifunctional. For example, a handheld device may have telecommunications capabilities, e-mail message capabilities, an advanced address book management system, a media playback system, and various other functions. Due to increased convenience and functions of the devices, these devices have become necessities of life.

Currently, a handheld device may provide image capturing (picture-taking) capabilities operating like a digital camera. Due to the convenient function, taking pictures with handheld device has become a very common behavior. To take a picture with yourself in the picture, sometimes you may need someone helping you out. For example, you may need someone else to take a picture of you at somewhere in the scenery. However, it is very hard to describe what you like the picture to be to others, therefore, it often takes several tries to get an acceptable result.

One way to assist someone to take a picture is to take a picture of the scenery by yourself first, called the template picture, hand the device to another person, go to the place, and then let the person take a picture with similar scenery by mimicking the template picture you take and you in the scenery. However, mimicking the template picture can be very tedious or even annoying in practice. Also, the burdensome processes of repeated shots may sometimes result in additional consumptions of system resources.

BRIEF SUMMARY OF THE INVENTION

Image capture methods and systems with positioning and angling assistance are provided.

In an embodiment of an image capture method with positioning and angling assistance, a reference image having a first set of feature points is provided. A preview image is captured and analyzed using a feature detecting algorithm to obtain a second set of feature points. A variation is calculated according to the first set of the feature points corresponding to the reference image and the second set of the feature points corresponding to the preview image, and a capturing prompt is generated according to the variation, thus to assist in positioning and angling the electronic device.

An embodiment of an image capture system with positioning and angling assistance includes a storage unit, an image capture unit, and a processing unit. The storage unit stores a reference image having a first set of feature points. The image capture unit captures at least one preview image. The processing unit analyzes the preview image using a feature detecting algorithm to obtain a second set of feature points corresponding to the preview image when the preview image is captured, calculates a variation according to the first set of the feature points corresponding to the reference image and the second set of the feature points corresponding to the preview image, and generates a capturing prompt according to the variation, thus to assist in positioning and angling the electronic device.

In some embodiments, the capturing prompt may be a voice or a visual marker displayed on a display unit of the electronic device.

In an embodiment of an image capture method with positioning and angling assistance, a reference image having a first set of feature points is provided. A preview image is captured and analyzed using a feature detecting algorithm to obtain a second set of feature points. A variation is calculated according to the first set of the feature points corresponding to the reference image and the second set of the feature points corresponding to the preview image, and a present-marker is rendered on a display unit according to a preset position and the variation.

An embodiment of an image capture system with positioning and angling assistance includes a storage unit, an image capture unit, a display unit, and a processing unit. The storage unit stores a reference image having a first set of feature points. The image capture unit captures at least one preview image. The processing unit analyzes the preview image using a feature detecting algorithm to obtain a second set of feature points corresponding to the preview image when the preview image is captured, calculates a variation according to the first set of the feature points corresponding to the reference image and the second set of the feature points corresponding to the preview image, and renders a present-marker on the display unit according to a preset position and the variation.

In an embodiment of an image capture method with positioning and angling assistance, a reference image is captured via an image capture unit. The reference image is analyzed using a feature detecting algorithm to obtain a first set of feature points corresponding to the reference image, and a target marker corresponding to the reference image is rendered on a display unit of the electronic device. A preview image is captured via the image capture unit. The preview image is analyzed using the feature detecting algorithm to obtain a second set of feature points corresponding to the preview image. A variation is calculated according to the first set of the feature points corresponding to the reference image and the second set of the feature points corresponding to the preview image, and a present-marker is rendered on the display unit according to the position of the target marker and the variation.

An embodiment of an image capture system with positioning and angling assistance includes an image capture unit, a display unit, and a processing unit. The image capture unit captures a reference image and at least one preview image. The processing unit analyzes the reference image using a feature detecting algorithm to obtain a first set of feature points corresponding to the reference image when the reference image is captured, and renders a target marker corresponding to the reference image on the display unit. The processing unit analyzes the preview image using the feature detecting algorithm to obtain a second set of feature points corresponding to the preview image when the preview image is captured, calculates a variation according to the first set of the feature points corresponding to the reference image and the second set of the feature points corresponding to the preview image, and renders a present-marker on the display unit according to the position of the target marker and the variation.

In some embodiments, the variation is calculated by matching the first set of the feature points corresponding to the reference image and the second set of the feature points corresponding to the preview image. In some embodiments, the variation comprises a shape-preserving mapping transform representing rotation, translation, and scaling between the first set of the feature points corresponding to the reference image and the second set of the feature points corresponding to the preview image.

In some embodiments, accumulation changes of position and angle of the electronic device are recorded via at least one sensor of the electronic device. The variation is adjusted according to the accumulation changes, and the present-marker is rendered on the display unit according to the position of the target marker and the adjusted variation.

In some embodiments, it is determined whether the present-marker is substantially matched with the target marker. When the present-marker is substantially matched with the target marker, a notification is generated, and a photography process is automatically performed to obtain an image via the image capture unit.

Image capture methods with positioning and angling assistance may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Image capture methods and systems with positioning and angling assistance are provided.

Figure 1:
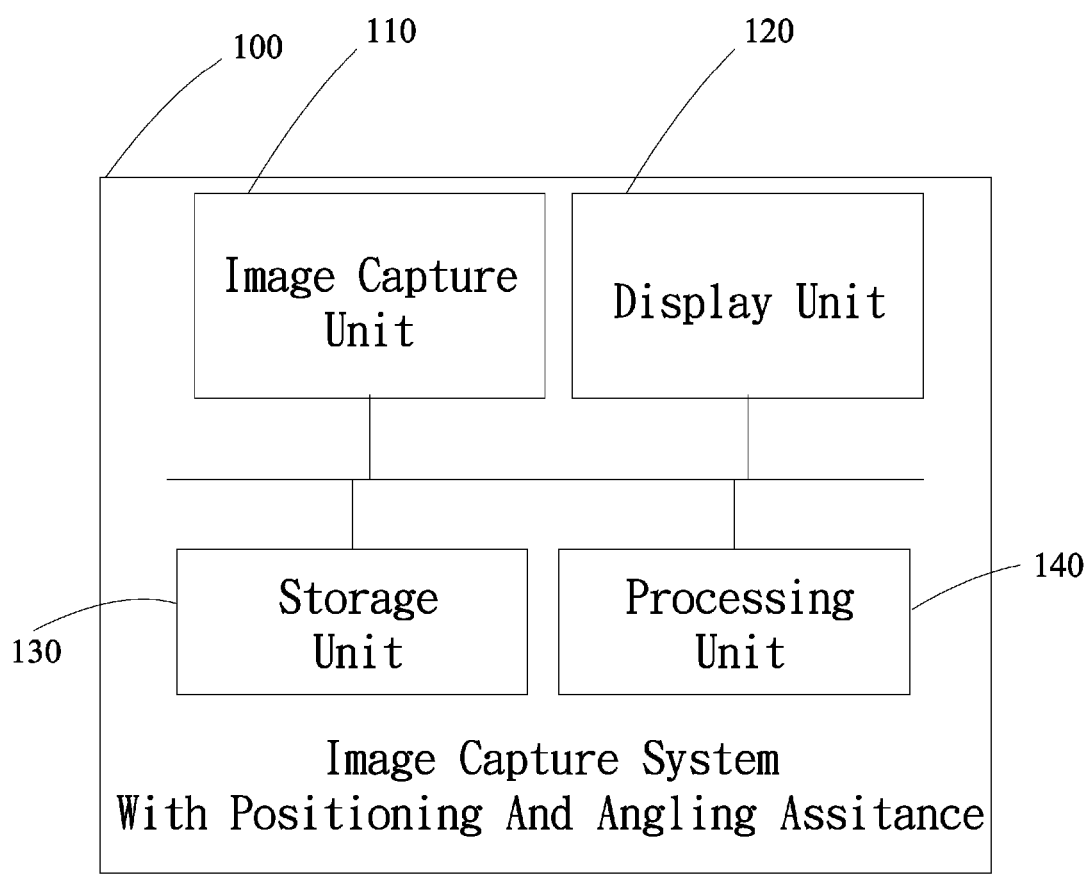
FIG. 1 is a schematic diagram illustrating an embodiment of an image capture system with positioning and angling assistance of the invention.

FIG. 1 is a schematic diagram illustrating an embodiment of an image capture system with positioning and angling assistance of the invention. The image capture system with positioning and angling assistance 100 can be used in an electronic device having image capture capability, such as a digital camera, or a picture-taking handheld device such as a mobile phone, a smart, phone, a PDA (Personal Digital Assistant), and a GPS (Global Positioning System).

The image capture system with positioning and angling assistance 100 comprises an image capture unit 110, a display unit 120, a storage unit 130, and a processing unit 140. The image capture unit 110 may be a CCD (Charge Coupled Device) or a CMOS (Complementary Metal-Oxide Semiconductor), placed at the imaging position for objects inside the electronic device. The display unit 120 can display related figures and interfaces, and related data, such as the preview images continuously captured by the image capture unit 110, and the image captured by the image capture unit 110 during a photography process. It is noted that, the preview image is not actually stored in the storage unit 130. It is understood that, in some embodiments, the display unit 120 may be a screen integrated with a touch-sensitive device (not shown). The touch-sensitive device has a touch-sensitive surface comprising sensors in at least one dimension to detect contact and movement of an input tool, such as a stylus or finger on the touch-sensitive surface. That is, users can directly input related data via the display unit 120. It is understood that, the image data captured by the image capture unit 110 can be permanently or temporarily stored in the storage unit 130, which may be a built-in memory, or an external memory card of the image capture system, with positioning and angling assistance 100. The processing unit 140 can control related components of the image capture system with positioning and angling assistance 100, process the preview images continuously captured by the image capture unit 110, and/or the image captured by the image capture unit 110 during the photography process, and perform the image capture methods with positioning and angling assistance of the invention, which will be discussed further in the following paragraphs. It is noted that, the image capture system with positioning and angling assistance 100 can further comprise a focus unit (not shown in FIG. 1). The processing unit 140 can control the focus unit to perform a focus process for at least one object during a photography process. Further, in some embodiments, the image capture system with positioning and angling assistance 100 can comprise at least one sensor, such as an accelerometer, and/or a gyro-meter, which can be used to detect/record accumulation changes of position and angle of the electronic device.

Figure 2:
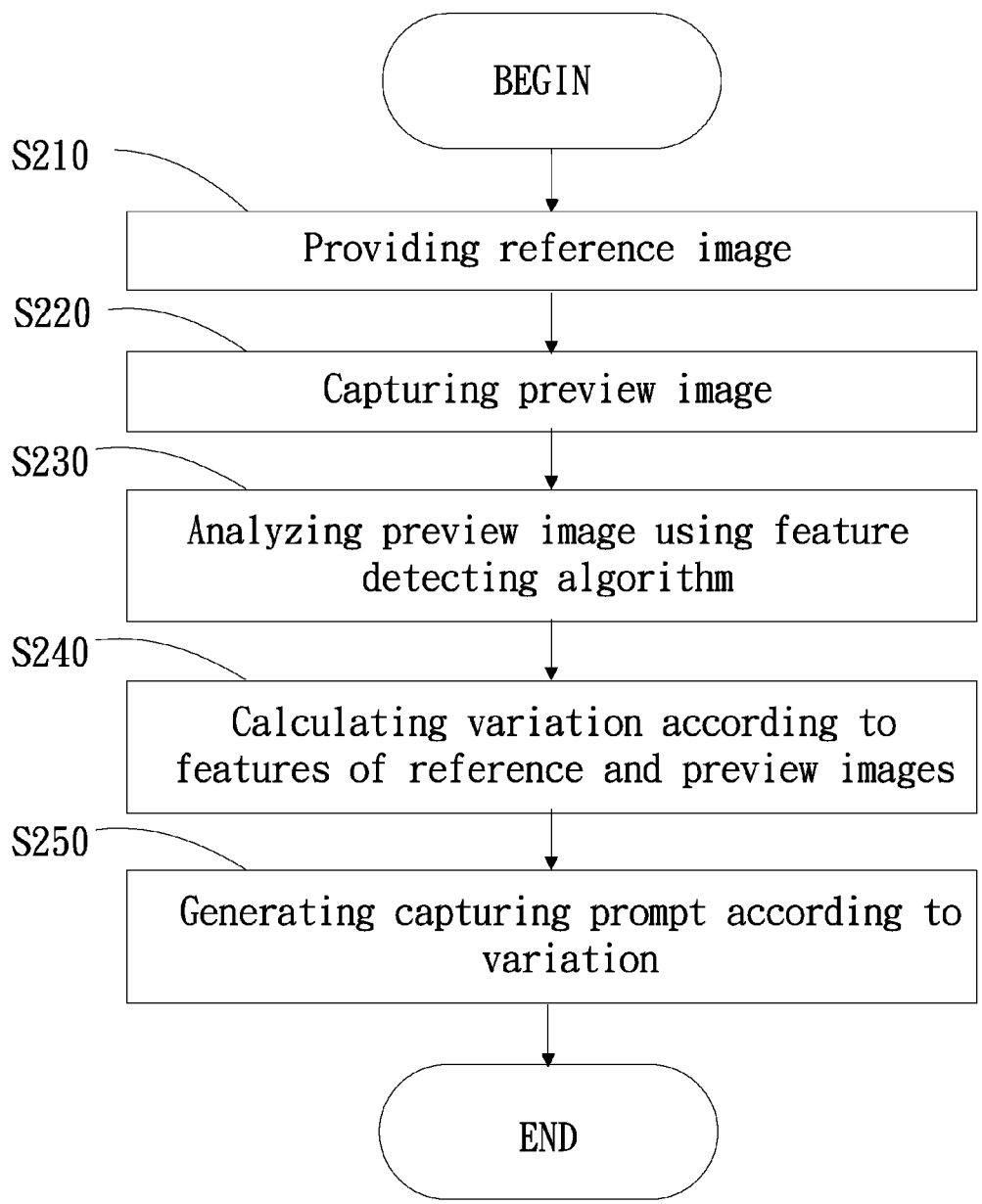
FIG. 2 is a flowchart of an embodiment of an image capture method with positioning and angling assistance of the invention.

FIG. 2 is a flowchart of an embodiment of an image capture method with positioning and angling assistance of the invention. The image capture method with positioning and angling assistance can be used in an electronic device having image capture capability, such as a digital camera, or a picture-taking handheld device such as a mobile phone, a smart phone, a PDA, and a GPS. In the embodiment, a capturing prompt can be generated for assisting in positioning and angling the electronic device.

In step S210, a reference image is provided. The reference image can have a first set of feature points corresponding to the reference image, it is noted that, the reference image can be analyzed using a feature detecting algorithm to obtain the first set of feature points corresponding to the reference image. It is understood that, in some embodiments, the feature detecting algorithm can be used to detect corners, intersections, or regions of the reference image. It is noted that, the feature detecting algorithm of the invention is not limited to any algorithm. In step S220, a preview image is captured via an image capture unit of the electronic device. In step S230, the preview image is analyzed using the feature detecting algorithm to obtain a second set of feature points corresponding to the preview image. Similarly, in some embodiments, the feature detecting algorithm cart be used to detect corners, intersections, or regions of the preview image. It is noted that, the feature detecting algorithm of the invention is not limited to any algorithm. In step S240, a variation is calculated according to the first set of the feature points corresponding to the reference image and the second set of the feature points corresponding to the preview image. It is understood that, in some embodiments, the variation is calculated by matching the first set of the feature points corresponding to the reference image and the second set of the feature points corresponding to the preview image. In some embodiments, the variation comprises a shape-preserving mapping transform representing rotation, translation, and scaling between the first set of the feature points corresponding to the reference image and the second set of the feature points corresponding to the preview image. In the calculation, the feature points of the reference image and the preview image and image registration techniques can be used to compute the shape-preserving mapping transform. In step S250, a capturing prompt is generated according to the variation. It is understood that, in some embodiments, the capturing prompt may be a voice or a visual marker displayed on a display unit of the electronic device. Users can follow the capturing prompt to position and angle the electronic device. For example, a voice, such as "move forward", "move backward", "rotate clockwise", "rotate anticlockwise", and others can be also generated via a voice output unit or an instruction, such as arrows can be also displayed on the display unit according to the target marker and the present-marker, thus to assist in positioning and angling the electronic device.

Figure 3:
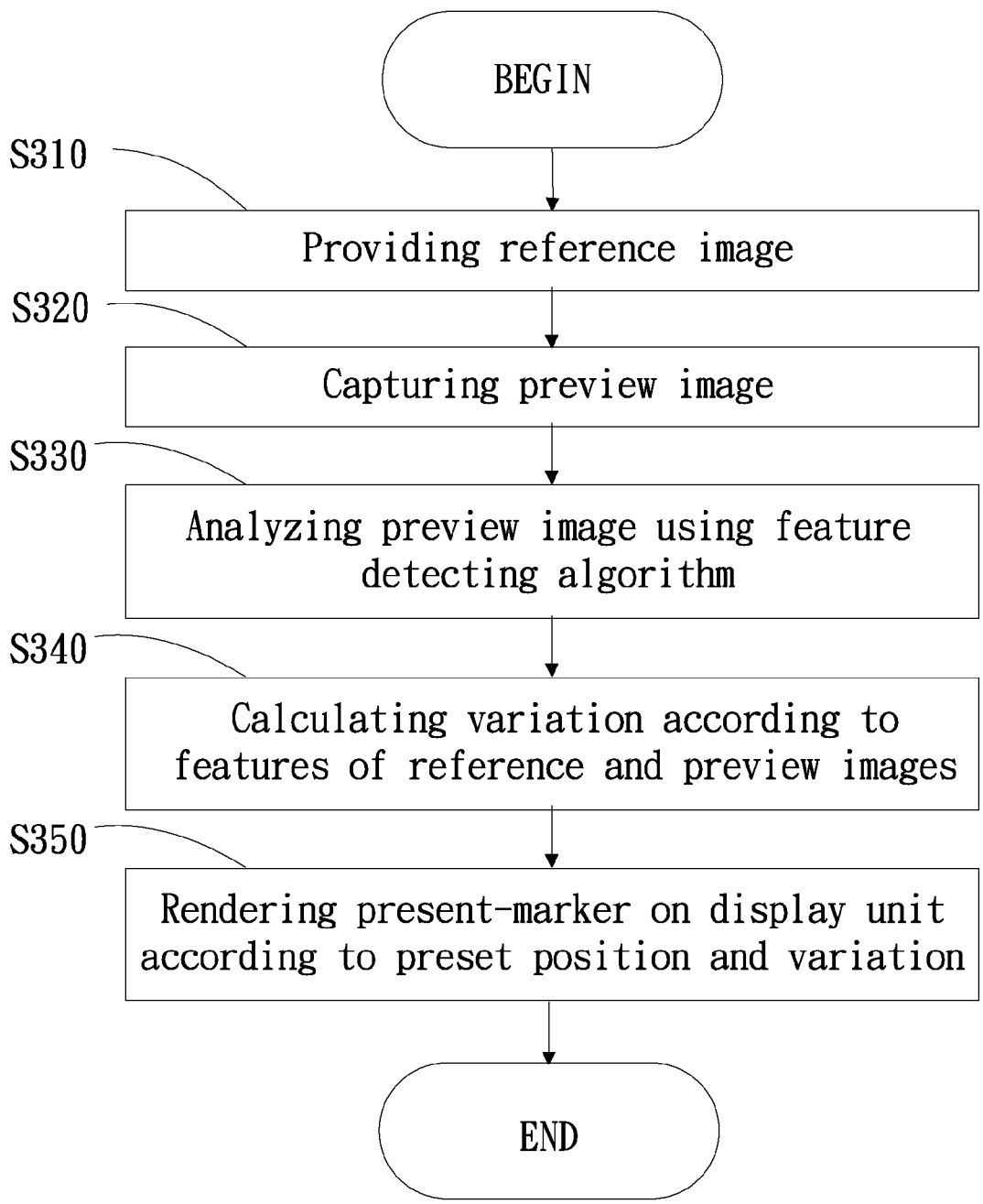
FIG. 3 is a flowchart of another embodiment of an image capture method with positioning and angling assistance of the invention.

FIG. 3 is a flowchart of an embodiment of an image capture method with positioning and angling assistance of the invention. The image capture method with positioning and angling assistance can be used in an electronic device having image capture capability, such as a digital camera, or a picture-taking handheld device such as a mobile phone, a smart phone, a PDA, and a GPS. In the embodiment, a present marker can be displayed for assisting in positioning and angling the electronic device.

In step S310, a reference image is provided. The reference image can have a first set of feature points corresponding to the reference image. It is noted that, the reference image can be analyzed using a feature detecting algorithm to obtain the first set of feature points corresponding to the reference image. It is understood that, in some embodiments, the feature detecting algorithm can be used to detect corners, intersections, or regions of the reference image. It is noted that, the feature detecting algorithm of the invention is not limited to any algorithm. In step S320, a preview image is captured via an image capture unit of the electronic device. In step S339, the preview image is analyzed using the feature detecting algorithm to obtain a second set of feature points corresponding to the preview image. Similarly, in some embodiments, the feature detecting algorithm can be used to detect corners, intersections, or regions of the preview image. It is noted that, the feature detecting algorithm of the invention is not limited to any algorithm. In step S340, a variation is calculated according to the first set of the feature points corresponding to the reference image and the second set of the feature points corresponding to the preview image. It is understood that, in some embodiments, the variation is calculated by matching the first set of the feature points corresponding to the reference image and the second set of the feature, points corresponding to the preview image. In some embodiments, the variation comprises a shape-preserving mapping transform representing rotation, translation, and scaling between the first set of the feature points corresponding to the reference image and the second set of the feature points corresponding to the preview image. In the calculation, the feature points of the reference image and the preview image and image registration techniques can be used to compute the shape-preserving mapping transform. In step S350, a present-marker is rendered on a display unit, of the electronic device according to a preset position and the variation. It is understood that, in some embodiments, the preset position may be the center of the display unit. In some embodiments, the present marker comprises a rectangle, a quadrangle, a cross, a 3-D object, four end-points, or others. It is understood that, in some embodiments, each edge, line, surface, or point of the target marker and the present-marker may have a respective color, such that users can easily determine whether the target marker and the present-marker are matched in size, angle, shape and direction. Users can follow the present-marker to position and angle the electronic device. Similarly, in some embodiments, a voice, such, as "move forward", "move backward", "rotate clockwise", "rotate anticlockwise", and others can be also generated via a voice output unit or an instruction, such as arrows can be also displayed on the display unit according to the target marker and the present-marker, thus to assist in positioning and angling the electronic device.

Figure 4:
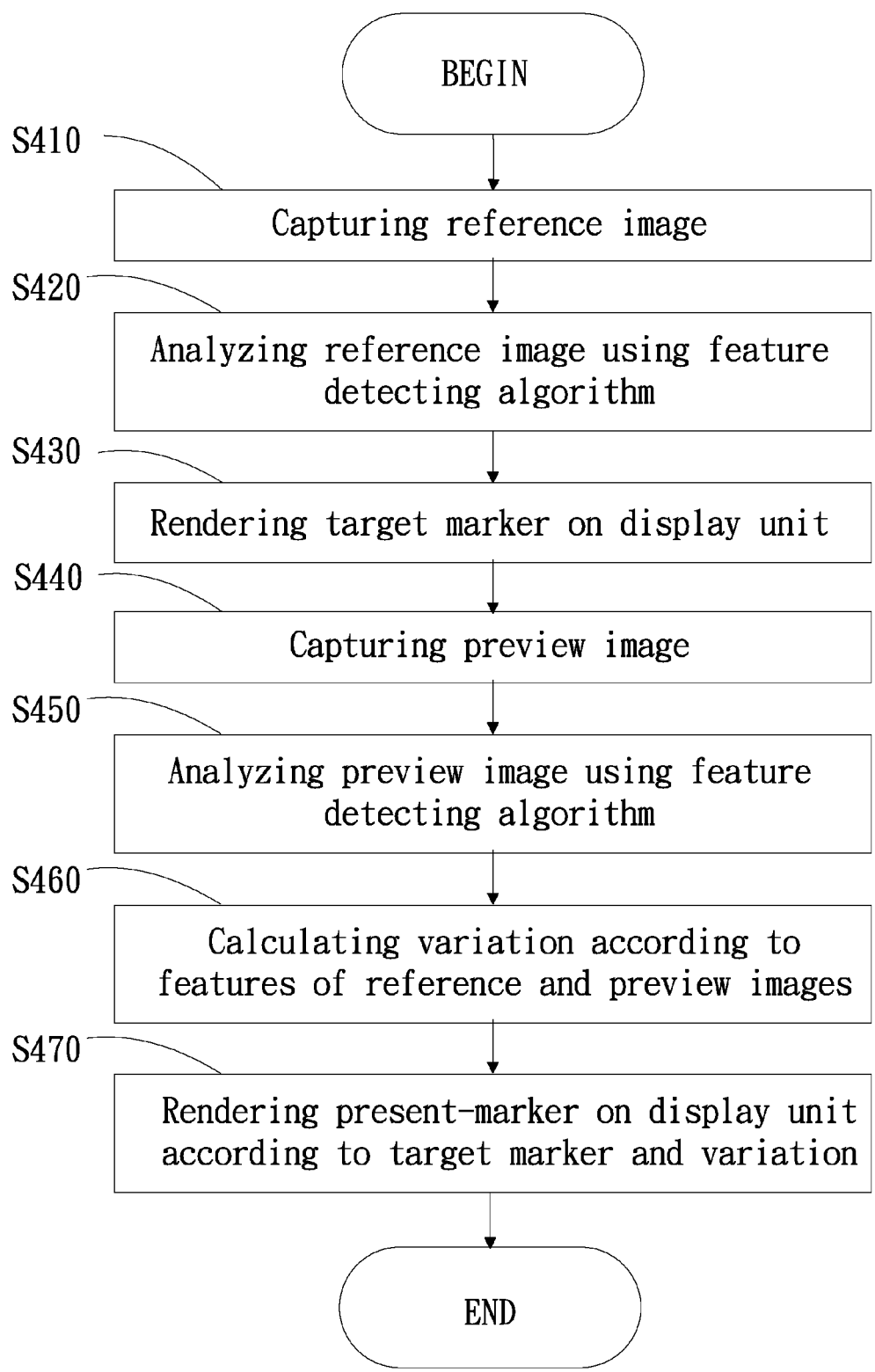
FIG. 4 is a flowchart of another embodiment of an image capture method with positioning and angling assistance of the invention.

FIG. 4 is a flowchart of an embodiment of an image capture method with positioning and angling assistance of the invention. The image capture method with positioning and angling assistance can be used in an electronic device having image capture capability, such as a digital camera, or a picture-taking handheld device such as a mobile phone, a smart phone, a PDA, and a GPS. In the embodiment, a target marker and a present marker can be displayed for assisting in positioning and angling the electronic device.

In step S410, a reference image is captured via the image capture unit of the electronic device. In step S420, the reference image is analyzed using a feature detecting algorithm to obtain a first set of feature points corresponding to the reference image. It is understood that, in some embodiments, the feature detecting algorithm can be used to detect corners, intersections, or regions of the reference image. It is noted that, the feature detecting algorithm of the invention is not limited to any algorithm. In step S430, a target marker corresponding to the reference image is rendered on the display unit of the electronic device. In some embodiments, the target marker is displayed on the center of the display unit. It is understood that, in some embodiments, the target marker can comprise a rectangle, a quadrangle, a cross, a 3-D object, four end-points, or others. In step S440, a preview image is captured via the image capture unit. In step S450, the preview image is analyzed using the feature detecting algorithm to obtain a second set of feature points corresponding to the preview image. Similarly, in some embodiments, the feature detecting algorithm can be used to detect corners, intersections, or regions of the preview image. It is noted that, the feature detecting algorithm of the invention is not limited to any algorithm. In step S460, a variation is calculated according to the first set of the feature points corresponding to the reference image and the second set of the feature points corresponding to the preview image. It is understood that, in some embodiments, the variation is calculated by matching the first set of the feature points corresponding to the reference image and the second set of the feature points corresponding to the preview image. In some embodiments, the variation comprises a shape-preserving mapping transform representing rotation, translation, and scaling between the first set of the feature points corresponding to the reference image and the second set of the feature points corresponding to the preview image. In the calculation, the feature points of the reference image and the preview image and image registration techniques can be used to compute the shape-preserving mapping transform. In step S470, a present-marker is rendered on the display unit according to the position of the target marker and the variation. Similarly, in some embodiments, the present marker comprises a rectangle, a quadrangle, a cross, a 3-D object, four end-points, or others. It is understood that, in some embodiments, each edge, line, surface, or point of the target marker and the present-marker may have a respective color, such that users can easily determine whether the target marker and the present-marker are matched in size, angle, shape and direction. Users can follow the present-marker to position and angle the electronic device. It is understood that, in some embodiments, a voice, such as "move forward", "move backward", "rotate clockwise", "rotate anti-clockwise", and others can be also generated via a voice output unit or an instruction, such as arrows can be also displayed on the display unit according to the target marker and the present-marker, thus to assist in positioning and angling the electronic device.

Figure 5:
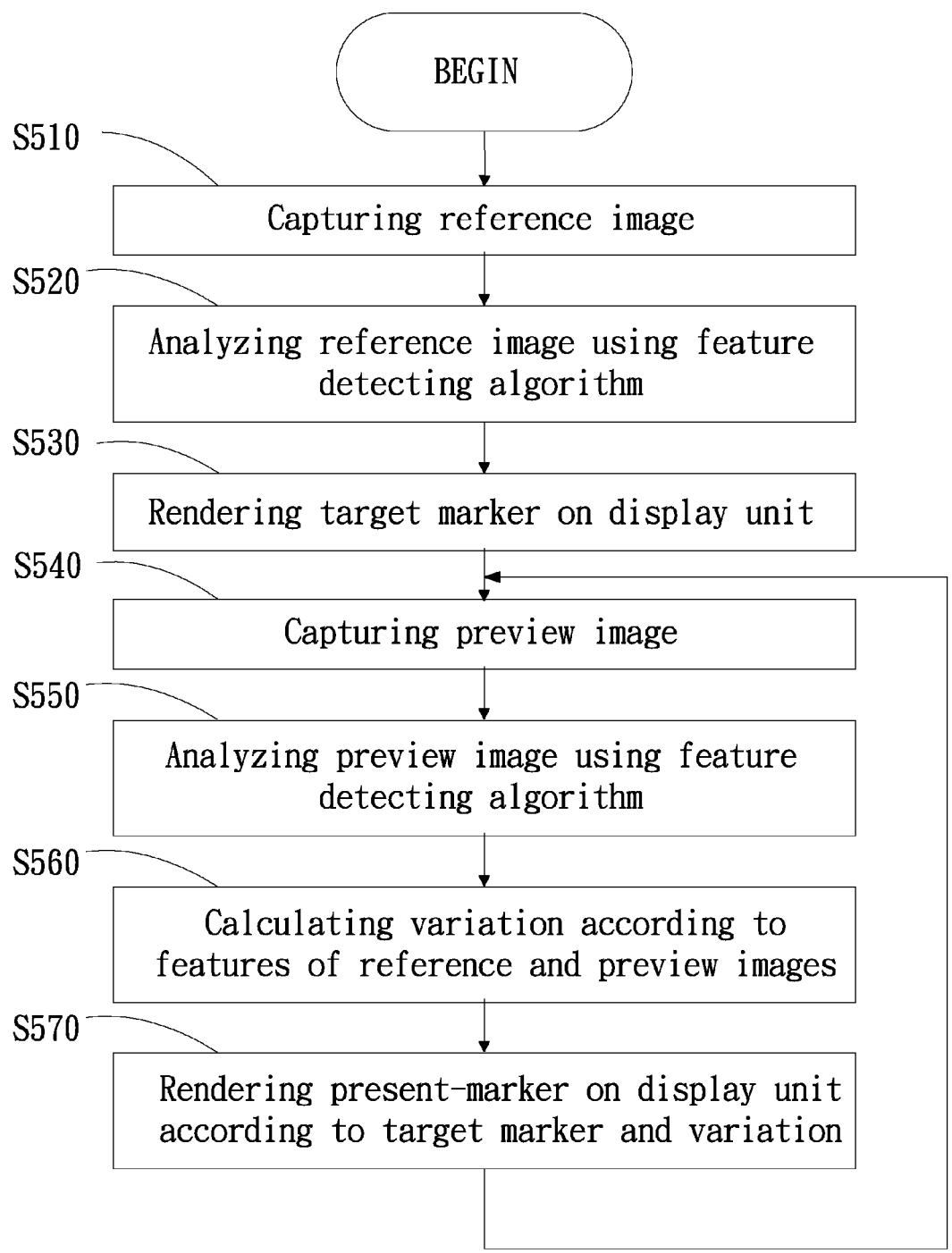
FIG. 5 is a flowchart of another embodiment of an image capture method with positioning and angling assistance of the invention.

FIG. 5 is a flowchart, of another embodiment of an image capture method with positioning and angling assistance of the invention. The image capture method with positioning and angling assistance can be used in an electronic device having image capture capability, such as a digital camera, or a picture-taking handheld device such as a mobile phone, a smart phone, a PDA, and a GPS. In the embodiment, a target marker corresponding to a reference image is always displayed on the display unit, and preview images can be continuously captured, and a respective present-marker corresponding to the respective preview image can be displayed on the display unit in sequence.

In step S510, a reference image is captured via the image capture unit of the electronic device. In step S520, the reference image is analyzed using a feature detecting algorithm to obtain a first set of feature points corresponding to the reference image. Similarly, in some embodiments, the feature detecting algorithm can be used to detect corners, intersections, or regions of the reference image. It is noted that, the feature detecting algorithm of the invention is not limited to any algorithm. In step S530, a target marker corresponding to the reference image is rendered on the display unit of the electronic device. In some embodiments, the target marker is displayed on the center of the display unit. It is understood that, in some embodiments, the target marker can comprise a rectangle, a quadrangle, a cross, a 3-D object, four end-points, or others. In step S540, a preview image is captured via the image capture unit. In step S550, the preview image is analyzed using the feature detecting algorithm to obtain a second set of feature points corresponding to the preview image. Similarly, in some embodiments, the feature detecting algorithm can be used to detect corners, intersections, or regions of the preview image. It is noted that, the feature defecting algorithm of the invention is not limited to any algorithm. In step S560, a variation is calculated according to the first set of the feature points corresponding to the reference image and the second set of the feature points corresponding to the preview image. Similarly, in some embodiments, the variation is calculated by matching the first set of the feature points corresponding to the reference image and the second set of the feature points corresponding to the preview image. In some embodiments, the variation comprises a shape-preserving mapping transform representing rotation, translation, and scaling between the first set of the feature points corresponding to the reference image and the second set of the feature points corresponding to the preview image. In the calculation, the feature points of the reference image and the preview image and image registration techniques can be used to compute the shape-preserving mapping transform. In step S570, a present-marker is rendered on the display unit according to the position of the target marker and the variation. Similarly, in some embodiments, the present marker comprises a rectangle, a quadrangle, a cross, a 3-D object, four end-points, or others. It is understood that, in some embodiments, each edge, line, surface, or point of the target marker and the present-marker may have a respective color, such that users can easily determine whether the target marker and the present-marker are matched in size, angle, shape, and direction. Users can follow the present-marker to position and angle the electronic device. If the target marker and the present-marker are substantially matched, a button for performing a photography process can be pressed. If the target marker and the present-marker are not matched, users can keep try to adjust the position and angle of the electronic, such that, another preview image can be further captured by the image capture unit in step S540, and steps S550 to S570 are repeated until the button for performing a photography process is pressed (the target marker and the present-marker are substantially matched). Similarly, in some embodiments, a voice can be also generated via a voice output unit or an instruction can be also displayed on the display unit according to the target marker and the present-marker, thus to assist in positioning and angling the electronic device.

Figure 6:
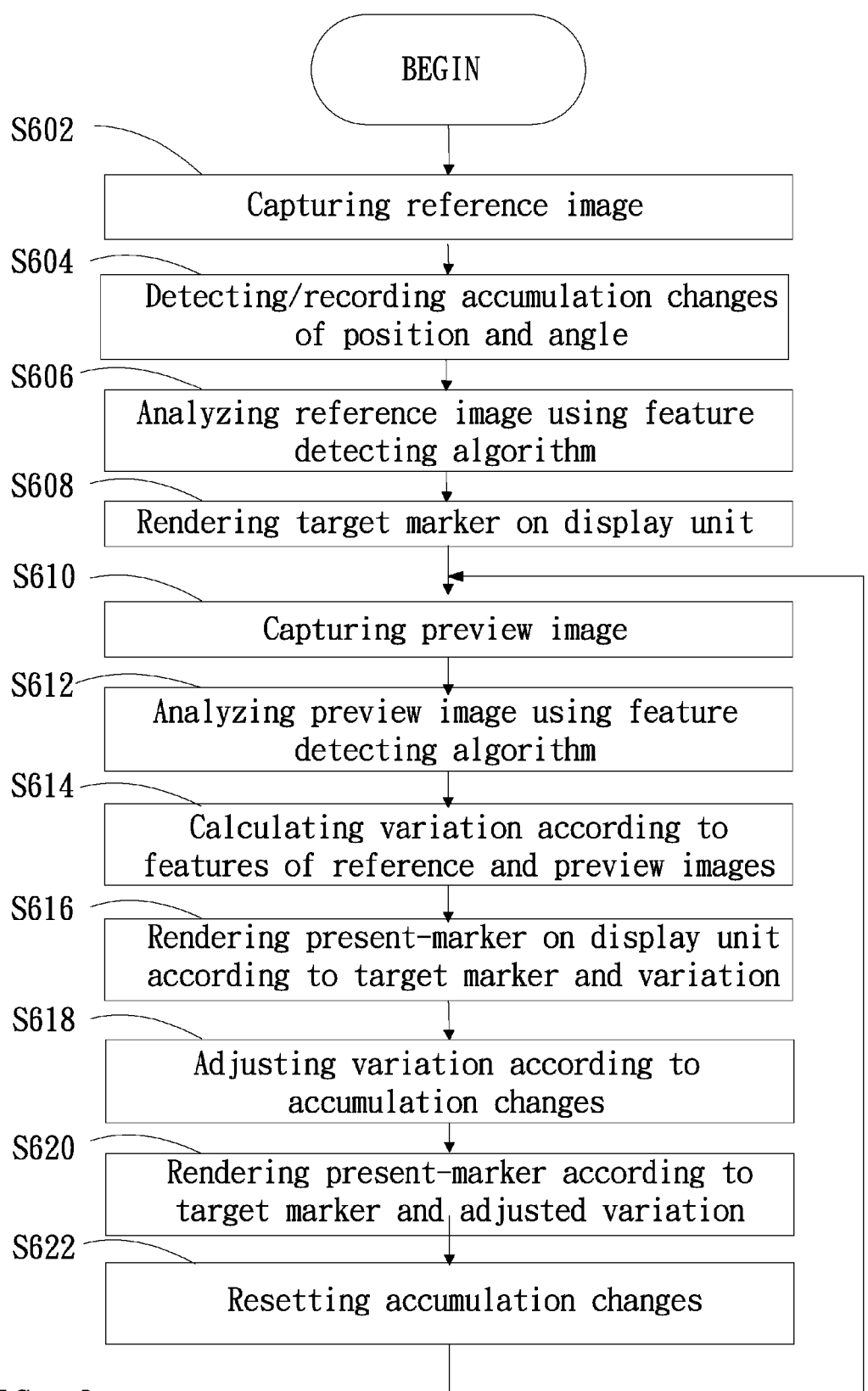
FIG. 6 is a flowchart of another embodiment of an image capture method with positioning and angling assistance of the invention.

FIG. 6 is a flowchart of another embodiment of an image capture method with positioning and angling assistance of the invention. The image capture method with positioning and angling assistance can be used in an electronic device having image capture capability, such as a digital camera, or a picture-taking handheld device such as a mobile phone, a smart phone, a PDA, and a GPS. In the embodiment, the electronic device comprises at least one sensor to detect the accumulation changes of position and angle of the electronic device. The accumulation changes can be used to adjust the present-marker.

In step S602, a reference image is captured via the image capture unit of the electronic device. Once the reference image is captured, in step S604, accumulation changes of position and angle of the electronic device are detected and recorded via the at least one sensor of the electronic device. It is understood that, in some embodiments, the sensor can comprise an accelerometer, and/or a gyro-meter. It is noted that, the described sensors of the embodiment are only examples of the invention, and the present invention is not limited thereto. In step S606, the reference image is analyzed using a feature detecting algorithm to obtain a first set of feature points corresponding to the reference image. Similarly, in some embodiments, the feature detecting algorithm can be used to detect corners, intersections, or regions of the reference image. It is noted that, the feature detecting algorithm of the invention is not limited to any algorithm. In step S608, a target marker corresponding to the reference image is rendered on the display unit of the electronic device. In some embodiments, the target marker is displayed on the center of the display unit. It is understood that, in some embodiments, the target marker can comprise a rectangle, a quadrangle, a cross, a 3-D object, four end-points, or others. In step S610, a preview image is captured via the image capture unit. In step S612, the preview image is analyzed using the feature detecting algorithm to obtain a second set of feature points corresponding to the preview image. Similarly, in some embodiments, the feature detecting algorithm can be used to detect corners, intersections, or regions of the preview image. It is noted that, the feature detecting algorithm of the invention is not limited to any algorithm. In step S614, a variation is calculated according to the first set of the feature points corresponding to the reference image and the second set of the feature points corresponding to the preview image. Similarly, in some embodiments, the variation is calculated by matching the first set of the feature points corresponding to the reference image and the second set of the feature points corresponding to the preview image. In some embodiments, the variation comprises a shape-preserving mapping transform representing rotation, translation, and scaling between the first set of the feature points corresponding to the reference image and the second set of the feature points corresponding to the preview image. In the calculation, the feature points of the reference image and the preview image and image registration techniques can be used to compute the shape-preserving mapping transform. In step S616, a present-marker is rendered on the display unit according to the position of the target marker and the variation. Similarly, in some embodiments, the present marker comprises a rectangle, a quadrangle, a cross, a 3-D object, four end-points, or others. It is understood that, in some embodiments, each edge, line, surface, or point of the target marker and the present-marker may have a respective color, such that users can easily determine whether the target marker and the present-marker are matched in size, angle, shape, and direction. Users can follow the present-marker to position and angle the electronic device. In step S618, the variation is adjusted according to the accumulation changes, and in step S620, the present-marker is rendered on the display unit according to the position of the target marker and the adjusted variation. That is, the present-marker corresponding to the preview image is adjusted according to the accumulation changes detected by the at least one sensor of the electronic device. It is understood that, in some embodiments, the accumulated position and angle changes can be calculated in sampling frequency Fs, which is usually greater than Fr (frequency of preview image to be captured) due to less computation intensive, to help extrapolate the transformation before the next transformation is successfully computed by the image-based method. Then, in step S622, the accumulation changes of position and angle of the electronic device are reset, and the procedure returns to step S610. Similarly, if the target marker and the present-marker are substantially matched, a button for performing a photography process can be pressed. If the target marker and the present-marker are not matched, users can keep try to adjust the position and angle of the electronic, such that another preview image can be further captured by the image capture unit in step S610, and steps S612 to S622 are repeated until the button for performing a photography process is pressed (the target marker and the present-marker are substantially matched). Similarly, in some embodiments, a voice can be also generated via a voice output unit or an instruction can be also displayed on the display unit according to the target marker and the present-marker, thus to assist in positioning and angling the electronic device.

Figure 7:
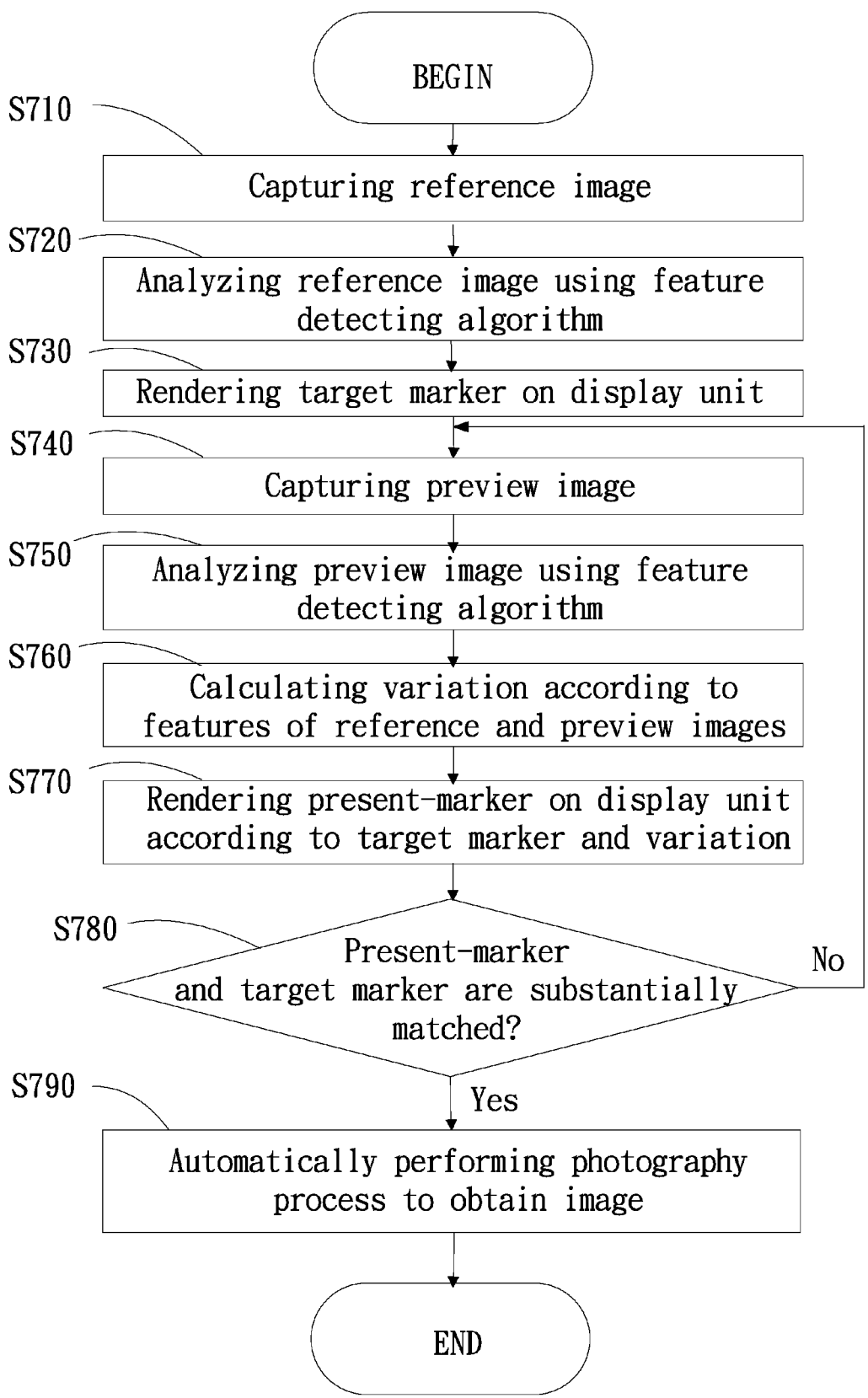
FIG. 7 is a flowchart of another embodiment of an image capture method with positioning and angling assistance of the invention.

FIG. 7 is a flowchart of another embodiment of an image capture method with positioning and angling assistance of the invention. The image capture method with positioning and angling assistance can be used in an electronic device having image capture capability, such as a digital camera, or a picture-taking handheld device such as a mobile phone, a smart phone, a PDA, and a GPS. In the embodiment, a photography process can be automatically performed when target marker and the present-marker are substantially matched.

In step S710, a reference image is captured via the image capture unit of the electronic device. In step S720, the reference image is analyzed using a feature detecting algorithm to obtain a first set of feature points corresponding to the reference image. Similarly, in some embodiments, the feature detecting algorithm can be used to detect corners, intersections, or regions of the reference image. It is noted that, the feature detecting algorithm of the invention is not limited to any algorithm. In step S730, a target marker corresponding to the reference image is tendered on the display unit of the electronic device. In some embodiments, the target marker is displayed on the center of the display unit. It is understood that, in some embodiments, the target marker can comprise a rectangle, a quadrangle, a cross, a 3-D object, four end-points, or others. In step S740, a preview image is captured via the image capture unit. In step S750, the preview image is analyzed using the feature detecting algorithm to obtain a second set of feature points corresponding to the preview image. Similarly, in some embodiments, the feature detecting algorithm can be used to detect corners, intersections, or regions of the preview image. It is noted that, the feature detecting algorithm of the invention is not limited to any algorithm. In step S760, a variation is calculated according to the first set of the feature points corresponding to the reference image and the second set of the feature points corresponding to the preview image. Similarly, in some embodiments, the variation is calculated by matching the first set of the feature points corresponding to the reference image and the second set of the feature points corresponding to the preview image. In some embodiments, the variation comprises a shape-preserving mapping transform representing rotation, translation, and scaling between the first set of the feature points corresponding to the reference image and the second set of the feature points corresponding to the preview image. In the calculation, the feature points of the reference image and the preview image and image registration techniques can be used to compute the shape-preserving mapping transform. In step S770, a present-marker is rendered on the display unit according to the position of the target marker and the variation. Similarly, in some embodiments, the present marker comprises a rectangle, a quadrangle, a cross, a 3-D object, four end-points, or others. It is understood that, in some embodiments, each edge, line, surface, or point of the target marker and the present-marker may have a respective color, such that users can easily determine whether the target marker and the present-marker are matched in size, angle, shape, and direction. Users can follow the present-marker to position and angle the electronic device. Similarly, in some embodiments, a voice can be also generated via a voice output unit or an instruction can be also displayed on the display unit according to the target marker and the present-marker, thus to assist in positioning and angling the electronic device. In step S780, it is determined whether the target marker and the present-marker are substantially matched. If the target marker and the present-marker are not matched (No in step S780), the procedure returns to step S740, another preview image is captured, and steps S750 to S780 are repeated. If the target marker and the present-marker are substantially matched (Yes in step S780), in step S790, the electronic device is enabled to perform a photography process to obtain an image via the image capture unit. It is understood that, in some embodiments, if the target marker and the present-marker are substantially matched (Yes in step S780), a notification, such as a message or voice can be first generated, and then the photography process is performed.

It is understood that, in some embodiments, a predefined time, such as two or ten seconds can be delayed before the performance of the photography process. After the predefined time, the electronic device performs the photography process via the image capture unit. It is noted that, in some embodiments, the photography process may comprise an auto-focusing process, thus to locate at least one object, such as the recognized specific object in the preview image, and set at least one focus point. The photography process can be performed based on the focus point. It is understood that, the setting of the focus point may vary according to different requirements and applications.

Figure 8A:
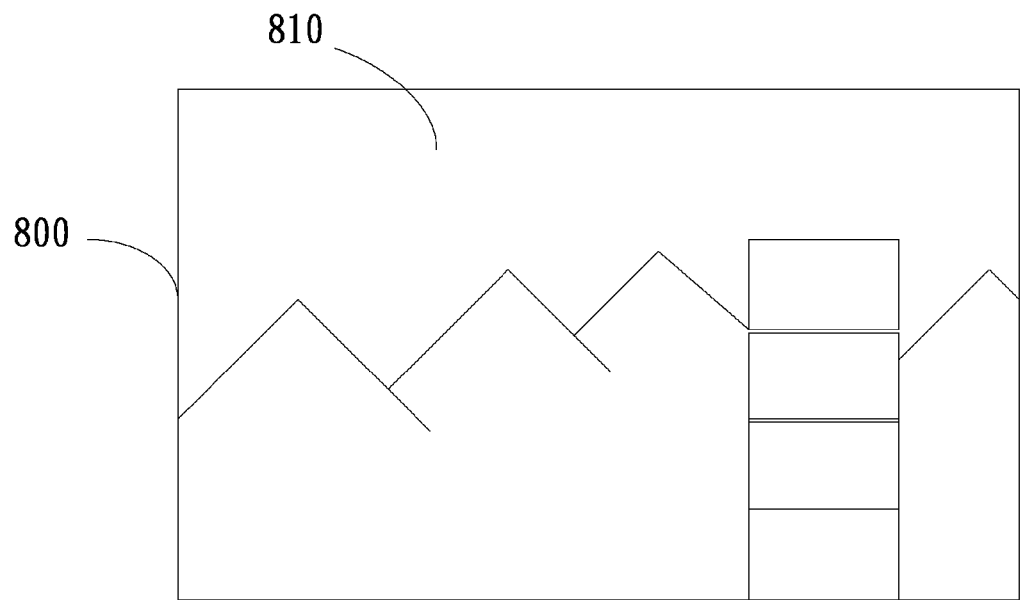
FIGS. 8A and 8B are schematic diagrams illustrating examples of image capture of the invention.
Figure 8B:
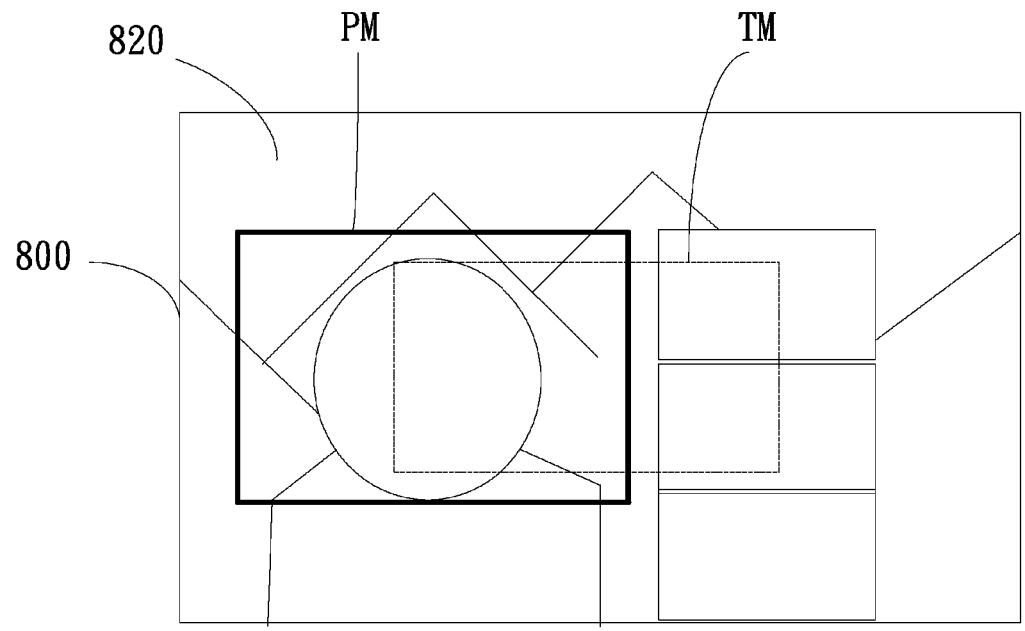

An example follows. Bob can first activate the assistance function of the present invention, and position and angle a handheld device with a camera to take a reference picture 810, which is displayed on the center of the display unit 800, as shown in FIG. 8A. It is understood that, in some embodiments, the resolution of the reference image can be reduced to speed up later processing time of the scene. The device will keep the reference image, and analyze the reference image using the feature detection algorithm to detect corners, intersections, regions, and so on, in the referenced image. It is understood that, it will also activate accelerometer and gyro-meter (if the hardware is presented on the device) to keep track of the accumulation change of position and angle starting from the time the reference image is taken. Then, the device is handed to another person to take an image with Bob in the scene. The device will provide abstract visual hints, called markers to instruct the person to do the shooting. When the person holds the device, a preview image 820 is captured, and a target marker TM corresponding to the reference image 810 is displayed on the center of the display unit 800, as shown in FIG. 8B. Further, a present-marker PM is generated and rendered according to the preview image 820 and/or the accumulation changes detected by the sensor. In the example, the target marker TM is a rectangle, wherein a rectangle outline used as the reference object is rendered on top of the preview image. The present-marker PM is a quadrangle visual hint. It is understood that, other types of visual hints, such as a cross, four end points, etc. are also suitable to provide correction hints of position and angle. The person can see a rectangle and a quadrangle on the display unit. By moving the position and the angle of the device, the quadrangle will change its shape and when the quadrangle aligns/matches with the rectangle, it means that the preview image is very close to reference image. The person can press the shutter to take the image, or a photography process can be automatically performed. In FIG. 8B, the quadrangle is rendered according to the shape-preserving transform based on the preview image and the reference image, and the dotted rectangle corresponds to the reference image. To align the quadrangle to the rectangle, the person can move himself away a little from Bob to make the quadrangle smaller, and move himself right a bit so that the quadrangle moves right. It is understood that, in some embodiments, the reference image can be scaled down and rendered on a corner of the display unit. Clicking on it will enlarge it to the size of the preview area of the display unit, and become a translucent layer on top of the preview image, so that the person can compare it to the preview image to confirm the position and the angle of the device.

It is noted that, in some embodiments, when the image-based method (the computation based on the preview image) is failed, the accumulation changes of position and angle of the electronic device detected via the at least one sensor may be used as the main source for generating the present-marker. That is, in some embodiments, without using the preview image, a present-marker can be calculated according to the target marker and the accumulation changes. Users can follow the present-marker to position and angle the electronic device.

Therefore, the image capture methods and systems with positioning and angling assistance can provide abstract visual hints, called markers to help people taking pictures, thus increasing operational convenience, and reducing power consumption of electronic devices for complicated operations.

Image capture methods with positioning and angling assistance, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention, has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. An image capture method with positioning and angling assistance for use in an electronic device, comprising:
    capturing a reference image;
    rendering and displaying a target marker based on analysis of the captured reference image on a display unit of the electronic device, wherein the target marker is overlapped on the reference image;
    capturing a preview image; and
    rendering and displaying a present-marker on the display unit according to the target marker and analysis of the captured preview image,
    wherein the target marker and the present-marker are concurrently overlapped on the preview image,
    the reference image is translucently overlapped on the preview image,
    whether the reference image and the preview image are substantially matched is determined by comparing the reference image and the preview image and by determining whether the target marker is substantially matched with the present marker, and
    the reference image is a fixed view image and the preview image is a live view image.

2. The method of claim 1, wherein a feature detecting algorithm is used to detect corners, intersections, or regions of the captured reference image or the captured preview image.

3. The method of claim 1, wherein the target marker is displayed on a center of the display unit.

4. The method of claim 1, wherein a variation is calculated by matching a first set of feature points corresponding to the captured reference image and a second set of the feature points corresponding to the captured preview image; and
the present-marker is rendered further based on the variation.

5. The method of claim 4, wherein the variation comprises a shape-preserving mapping transform representing rotation, translation, and scaling between the first set of the feature points corresponding to the captured reference image and the second set of the feature points corresponding to the captured preview image.

6. The method of claim 1, wherein the target marker or the present marker comprises a rectangle, a quadrangle, a cross, a 3-D object, or four end-points.

7. The method of claim 4, further comprising:
recording accumulation changes of position and angle of the electronic device via at least one sensor of the electronic device;
adjusting the variation according to the accumulation changes; and
rendering the present-marker on the display unit according to the position of the target marker and the adjusted variation.

8. The method of claim 7, wherein the sensor comprises an accelerometer, or a gyro-meter.

9. The method of claim 1, further comprising generating a voice via a voice output unit or displaying an instruction on the display unit according to the target marker and the present-marker, thus to assist in positioning and angling the electronic device.

10. The method of claim 4, further comprising:
capturing a second preview image via the image capture unit;
analyzing the captured second preview image to obtain a third set of feature points corresponding to the captured second preview image;
calculating a second variation according to the first set of the feature points corresponding to the captured reference image and the third set of the feature points corresponding to the captured second preview image; and
rendering a second present-marker on the display unit to replace the present-marker according to the position of the target marker and the second variation.

11. The method of claim 1, further comprising:
when the present-marker is substantially matched with the target marker, generating a notification, and automatically performing a photography process to obtain an image via the image capture unit.

12. An image capture system with positioning and angling assistance for use in an electronic device, comprising:
an image capture unit capturing a reference image and at least one preview image;
a display unit; and
a processing unit rendering and displaying a target marker based on analysis of the captured reference image on the display unit, wherein the target marker is overlapped on the reference image, and rendering and displaying a present-marker on the display unit according to the target marker and analysis of the captured preview image,
wherein the target marker and the present-marker are concurrently overlapped on the preview image,
the reference image is translucently overlapped on the preview image,
whether the reference image and the preview image are substantially matched is determined by comparing the reference image and the preview image and by determining whether the target marker is substantially matched with the present marker, and
the reference image is a fixed view image and the preview image is a live view image.

13. The system of claim 12, wherein a feature detecting algorithm is used to detect corners, intersections, or regions of the captured reference image or the captured preview image.

14. The system of claim 12, wherein the target marker is displayed on a center of the display unit.

15. The system of claim 12, wherein the processing unit calculates a variation by matching a first set of feature points corresponding to the captured reference image and a second set of the feature points corresponding to the captured preview image; and
the present-marker is rendered further based on the variation.

16. The system of claim 15, wherein the variation comprises a shape-preserving mapping transform representing rotation, translation, and scaling between the first set of the feature points corresponding to the captured reference image and the second set of the feature points corresponding to the captured preview image.

17. The system of claim 12, wherein the target marker or the present marker comprises a rectangle, a quadrangle, a cross, a 3-D object, or four end-points.

18. The system of claim 15, wherein the processing unit further records accumulation changes of position and angle of the electronic device via at least one sensor of the electronic device, adjusts the variation according to the accumulation changes, and renders the present-marker on the display unit according to the position of the target marker and the adjusted variation.

19. The system of claim 18, wherein the sensor comprises an accelerometer, or a gyro-meter.

20. The system of claim 12, wherein the processing unit further generates a voice via a voice output unit or displays an instruction on the display unit according to the target marker and the present-marker, thus to assist in positioning and angling the electronic device.

21. The system of claim 15, wherein the image capture unit further captures a second preview image, and the processing unit further analyzes the captured second preview image to obtain a third set of feature points corresponding to the captured second preview image, calculates a second variation according to the first set of the feature points corresponding to the captured reference image and the third set of the feature points corresponding to the captured second preview image, and renders a second present-marker on the display unit to replace the present-marker according to the position of the target marker and the second variation.

22. The system of claim 12, wherein when the present-marker is substantially matched with the target marker, the processing unit generates a notification, and automatically performs a photography process to obtain an image via the image capture unit.

23. An image capture method with positioning and angling assistance for use in an electronic device, comprising:
capturing a reference image;
capturing a preview image via an image capture unit;

analyzing the captured preview image; and rendering and displaying a present-marker on a display unit according to a preset position and analysis of the captured reference image and the captured preview image, wherein the reference image is translucently overlapped on the preview image, the reference image and the preview image are compared, and the reference image is a fixed view image and the preview image is a live view image.

24. An image capture system with positioning and angling assistance for use in an electronic device, comprising:

a storage unit comprising a captured reference image;

an image capture unit capturing at least one preview image;

a display unit; and a processing unit analyzing the captured preview image and rendering and displaying a present-marker on the display unit according to a preset position and analysis of the captured reference image and the captured preview image, wherein the reference image is translucently overlapped on the preview image, the reference image and the preview image are compared, and the reference image is a fixed view image and the preview image is a live view image.

25. An image capture method with positioning and angling assistance for use in an electronic device, comprising:

capturing a reference image;

capturing a preview image;

rendering and displaying a target marker based on analysis of the captured reference image, wherein the target marker is overlapped on the reference image;

analyzing the captured preview image for rendering and displaying a present-marker on the electronic device; and generating a capturing prompt according to the target marker and the present-marker, thus to assist in positioning and angling the electronic device, wherein the target marker and the present-marker are concurrently overlapped on the preview image, the reference image is translucently overlapped on the preview image, whether the reference image and the preview image are substantially matched is determined by comparing the reference image and the preview image and by determining whether the target marker is substantially matched with the present marker, and the reference image is a fixed view image and the preview image is a live view image.

26. The method of claim 25, wherein the capturing prompt comprises a voice or a visual marker displayed on a display unit of the electronic device.

27. An image capture system with positioning and angling assistance for use in an electronic device, comprising:

a storage unit comprising a captured reference image;

an image capture unit capturing a preview image; and a processing unit analyzing the captured reference image for rendering and displaying a target marker, analyzing the captured preview image for rendering and displaying a present-marker and generating a capturing prompt according to the target marker and the present-marker, thus to assist in positioning and angling the electronic device, wherein the target marker and the present-marker are concurrently overlapped on the preview image, the target marker is overlapped on the reference image, the reference image is translucently overlapped on the preview image, whether the reference image and the preview image are substantially matched is determined by comparing the reference image and the preview image and by determining whether the target marker is substantially matched with the present marker, and the reference image is a fixed view image and the preview image is a live view image.

28. The system of claim 27, wherein the capturing prompt comprises a voice or a visual marker displayed on a display unit of the electronic device.

29. A non-transitory machine-readable storage medium comprising a computer program, which, when executed, causes a device to perform an image capture method with positioning and angling assistance, wherein the method comprises:

rendering and displaying a target marker based on analysis of a captured reference image on a display unit of the electronic device, wherein the target marker is overlapped on the reference image;

capturing a preview image; and rendering and displaying a present-marker on the display unit according to the target marker and analysis of the captured preview image, wherein the target marker and the present-marker are concurrently overlapped on the preview image, the reference image is translucently overlapped on the preview image, whether the reference image and the preview image are substantially matched is determined by comparing the reference image and the preview image and by determining whether the target marker is substantially matched with the present marker, and the reference image is a fixed view image and the preview image is a live view image.

30. A non-transitory machine-readable storage medium comprising a computer program, which, when executed, causes a device to perform an image capture method with positioning and angling assistance, wherein the method comprises:

capturing a reference image;

capturing a preview image;

analyzing the captured preview image; and rendering and displaying a present-marker on a display unit according to a preset position and analysis of the captured reference image and the captured preview image, wherein the reference image is translucently overlapped on the preview image, the reference image and the preview image are compared, and the reference image is a fixed view image and the preview image is a live view image.

31. A non-transitory machine-readable storage medium comprising a computer program, which, when executed, causes a device to perform an image capture method with positioning and angling assistance, wherein the method comprises:

capturing a reference image;

capturing a preview image;

rendering and displaying a target marker based on analysis of the captured reference image;

analyzing the captured preview image for rendering and displaying a present-marker; and generating a capturing prompt according to the target marker and the present-marker, thus to assist in positioning and angling the electronic device, wherein the target marker and the present-marker are concurrently overlapped on the preview image, the target marker is overlapped on the reference image, the reference image is translucently overlapped on the preview image, whether the reference image and the preview image are substantially matched is determined by comparing the reference image and the preview image and by determining whether the target marker is substantially matched with the present marker, and the reference image is a fixed view image and the preview image is a live view image.

32. The method of claim 1, wherein the reference image is scaled down and rendered on a corner of the display unit; and in response to click on the scaled-down reference image, the scaled-down reference image is enlarged, and becomes a translucent layer on top of the preview image.

33. The system of claim 12, wherein the reference image is scaled down and rendered on a corner of the display unit; and in response to click on the scaled-down reference image, the scaled-down reference image is enlarged, and becomes a translucent layer on top of the preview image.

34. The method of claim 23, wherein the reference image is scaled down and rendered on a corner of the display unit; and in response to click on the scaled-down reference image, the scaled-down reference image is enlarged, and becomes a translucent layer on top of the preview image.

35. The system of claim 24, wherein the reference image is scaled down and rendered on a corner of the display unit; and in response to click on the scaled-down reference image, the scaled-down reference image is enlarged, and becomes a translucent layer on top of the preview image.

36. The method of claim 25, wherein the reference image is scaled down and rendered on a corner of the display unit; and in response to click on the scaled-down reference image, the scaled-down reference image is enlarged, and becomes a translucent layer on top of the preview image.

37. The system of claim 27, wherein the reference image is scaled down and rendered on a corner of the display unit; and in response to click on the scaled-down reference image, the scaled-down reference image is enlarged, and becomes a translucent layer on top of the preview image.

* * * * *